March 28, 1939. B. SKOOG 2,152,421
VEHICLE STAKE
Filed May 27, 1938
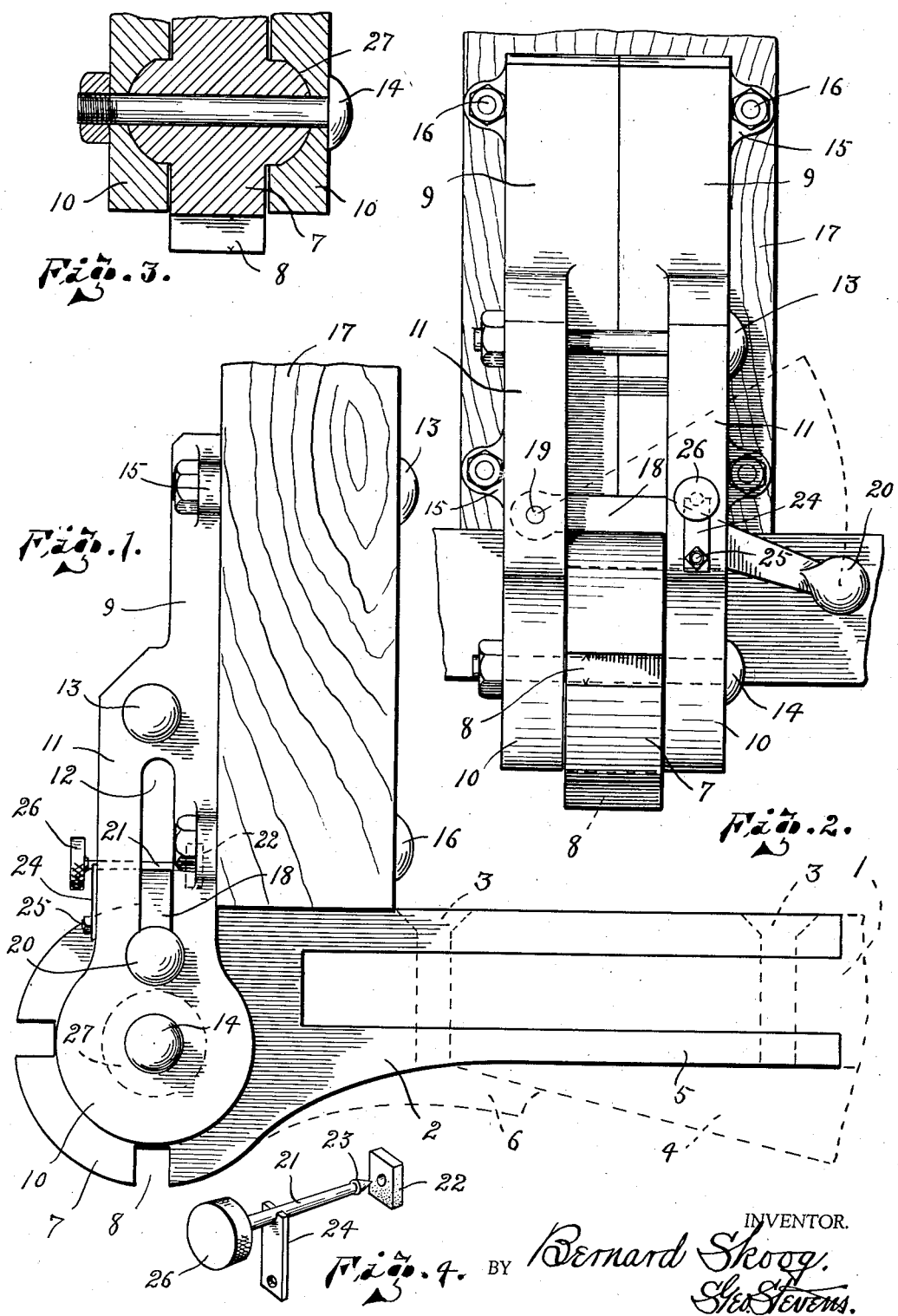
INVENTOR.
BY Bernard Skoog.
Geo. Stevens.
ATTORNEY.

Patented Mar. 28, 1939

2,152,421

UNITED STATES PATENT OFFICE 2,152,421

VEHICLE STAKE

Bernard Skoog, Grand Marais, Minn.

Application May 27, 1938, Serial No. 210,447

4 Claims. (Cl. 280—145)

This invention relates to vehicle stakes and has special reference to a novel form of adapter therefor, the principal object being to provide a simple, rugged, and efficient device of this character.

Another object is to provide such a device which may be easily manipulated and adjusted to hold the stake at different angles in relation to the platform or body of the vehicle when the latter is used for example in carrying bulky loads, such as hay or the like, in which event it would become especially adapted for use in farm operations. Or, when applied to the platform or deck of a truck for package handling, the stakes, in some instances, would carry a portion if not the entire side walls of the rack or box portion of the truck body, when the adapters may be adjusted to extend downwardly or towards the sidewalk or platform where loading takes place and thus function admirably as a running or toe board.

Other objects and advantages of the invention will appear in the following description thereof. Referring now to the accompanying drawing, forming part of this application, and wherein like reference characters indicate like parts:

Figure 1 is a side elevation of one embodiment of the improved adapter as applied to the deck of a truck and stake.

Figure 2 is a front elevation of Figure 1.

Figure 3 is a vertical section through the pivotal joint of the cooperative parts of the adapter.

Figure 4 is a perspective view of one form of lock holding pin.

In the drawing, 1 represents the edge of the deck of a vehicle such as a truck or the like and to which the bifurcated member 2 is attached as by any desired form of suitable bolts or rivets 3 as the case may require, and, if such a deck is supported about its sides or end with bracket like projections suggested at 4, it is apparent that the lower member 5 of the bifurcated portion of the bracket 2 may be shaped to correspond to such inclined member as for example as suggested at 6.

This bracket 2 terminates outwardly from the bifurcated portion in the short cylindrical portion 7, and which bracket in its entirety would be made of a thickness adapted for the purpose and provided with a plurality, in this instance shown as three, radially disposed rectangular notches or channels transverse the face thereof as at 8, and which permit of the adjustable portion 9 of the adapter carrying the stake to be held in any one of such notches. Obviously there may be more of such notches if so desired, that is to say, there may be for example two more of such notches 8 intermediate of those shown in the drawing so that the adapter may be set to support a stake at an angle of 45° either above or below the plane of the axis thereof.

The adjustable portion of the adapter is shown as being made of two like halves, indicated at 9, the lower extremities of which are of somewhat cylindrical construction as indicated at 10, and this portion of each member 9 extends upwardly from such cylindrical portion and is materially wider for some distance upwardly as at 11 to provide stock for the vertically disposed slots 12 in such outwardly and upwardly extending portion 11 and above which slots and through said extensions is installed the holding bolts 13 for uniting the two parts 9 as a single unit.

The outer similarly shaped and sized bolt is indicated at 14 and forms the pintle of the pivotal joint of the two members 9—9 and 2. Each member 9 is shown as provided with a laterally extending lug 15 for the reception of suitable bolts such as indicated at 16 or lag screws or the like, if preferred, for attachment to the stake shown at 17, or obviously the upper end of the member 9 may terminate in the form of rings, or a socket for the reception of a suitable shaft stake without being rigidly fixed thereto. As a means for securely holding the adjustable portion of the adapter in any predetermined position I have illustrated the latch 18 as being pivotally supported as at 19 with the slot 12 in one of the members 9 while it is swingably operable within the other of said slots 12 as clearly shown in Figure 2 of the drawing, the free end being raised or lowered within said latter slot as by the knobbed handle 20 extending outwardly from the adapter so that as is apparent when this latch is in the position shown in the drawing it must fit into one or another of the slots 8 and thus hold the adapter from further adjustment until the latch is swung out of engagement with any notch of the fixed portion 2.

As a means for dependably locking the latch 18 in any of its holding positions I have shown a somewhat novel form of pin indicated at 21 insertable within a suitable hole through that one of the members 11 which permits of the swinging up and down of the latch 18 and just above the inclined edge of said latch, so that when the latter is established in any one of its possible adjusted positions, this pin may be inserted above same to prevent its movement. To prevent the pin from being accidentally dislodged I have shown a small section of rubber indicated at 22, housed within a recess provided therefor in the corresponding member 9, and the pin having a pointed head portion 23 may be readily forced into or through the rubber washer 22 which will normally hold same in position though not prevent its being readily withdrawn when desired. As a means for preventing the pin being wholly withdrawn and lost, I have illustrated a simple expedient such as the spring clip 24 fixed as at 25 to the outer face of the member 11, having a hole therethrough for same. The upper end of this spring is bifurcated for a distance say slightly more than half the diameter of the pin 21 so that when insertion of the sharpened end of the pin into this hole is accomplished by forcing it downwardly just above the bifurcated portion it will yield outwardly to allow the enlarged head 23 to enter the hole, when the upper end of the member 24 will function as a bar, if desired, or at least prevent the too easy withdrawal of the pin, the latter having a suitable head indicated at 26 for its convenient manipulation, though other means of securing the latch may be resorted to without departing from the spirit of the invention.

As additional frictional contact of the enlarged cylindrical portions 10 and 7 of the members 9 and 2, respectively, I have provided semi-ball and socket joints at either lateral terminus of the joint as indicated at 27, thus providing means whereby to adjust the bolt 14 to provide the desired frictional contact of the joint, and also enhance the serviceability of the same.

Having thus described my invention, what I claim and desire to secure by Letters Patent, is:

1. In an adapter for vehicle stakes, means for rigid attachment to the marginal edge of the deck of a vehicle, said means having an enlarged cylindrical portion for extension beyond said deck, means for rigid attachment to a stake, said latter means being of two separable like halves each having an enlarged cylindrical portion for clamping engagement, against opposite sides of the similar enlargement of said first mentioned means, and a latch pivotally carried upon said last mentioned means and selectively engageable with the cylindrical engagement of said first mentioned means, whereby to vary the relative angle of said deck and stake carrying means.

2. An adjustable pivotal joint for a vehicle stake adapter, consisting of a cylindrical central fixed portion and a pair of clamping members for attachment to the lower end of a stake and engageable upon either side of said central fixed portion as by an adjustable nut and bolt centrally therethrough, and a latch pivotally carried within said clamping means and selectively engageable with said central fixed portion.

3. In an adapter for vehicle stakes, means for rigid attachment adjacent the edge of the body portion of the vehicle and extending laterally therefrom, means for supporting a stake, comprising two like separable halves for pivotal and clamping engagement with said extending portion of the first mentioned means and selective locking means carried by said like separable halves for holding the stake in any one of a predetermined number of positions in relation to said rigid attachment.

4. In an adapter for vehicle stakes, means for rigid attachment to the marginal edge of the deck of a vehicle, said means including a cylindrical enlargement extending beyond said deck, and the axis of which enlargement is parallel with the side of said deck, said enlargement carrying relatively deep circumferentially spaced notches therein, means for contact with a stake having outwardly and downwardly extending spaced portions for pivotal engagement against the opposite ends of said cylindrical enlargement, and a latch pivoted within one of said spaced portions and operable within the other of said spaced portions for selective engagement within the notches in said cylindrical enlargement for holding the stake at any of the predetermined angles to said deck.

BERNARD SKOOG.